United States Patent [19]
Wollmann et al.

[11] 3,870,750
[45] Mar. 11, 1975

[54] PROCESS FOR THE PRODUCTION OF AMINOMETHANE-DIPHOSPHONIC ACID AND ITS SALTS

[75] Inventors: Klaus Wollmann; Walter Plöger, both of Hilden; Karl-Heinz Wopms, Dusseldorf-Holthausen, all of Germany

[73] Assignee: Henkel & Cie GmbH, Dusseldorf, Germany

[22] Filed: Apr. 26, 1972

[21] Appl. No.: 247,605

Related U.S. Application Data

[63] Continuation of Ser. No. 90,455, Nov. 17, 1970, abandoned.

[30] Foreign Application Priority Data
Nov. 19, 1969  Germany.......................... 1958124

[52] U.S. Cl.................. 260/502.5, 252/DIG. 11, 252/DIG. 17, 260/290 R, 260/501.12, 260/501.14
[51] Int. Cl. ............................................. C07f 9/38
[58] Field of Search................................ 260/502.5

[56] References Cited
UNITED STATES PATENTS
| | | | |
|---|---|---|---|
| 3,202,579 | 8/1965 | Perth et al. .................. | 260/502.4 A |
| 3,565,949 | 2/1971 | Cummins....................... | 260/502.5 |

FOREIGN PATENTS OR APPLICATIONS
| | | | |
|---|---|---|---|
| 978,297 | 12/1964 | Great Britain................ | 260/502.4 A |
| 995,462 | 6/1965 | Great Britain................ | 260/502.5 |
| 1,002,355 | 2/1957 | Germany ...................... | 260/502.5 |

*Primary Examiner*—Joseph E. Evans
*Attorney, Agent, or Firm*—Hammond & Littell

[57] ABSTRACT

A process for the production of aminomethane-diphosphonic acid and its salts which consists essentially of the steps of reacting a phosphorus trihalide selected from the group consisting of phosphorus trichloride and phosphorus tribromide with formamide at a temperature of from 0° to 75°C., subjecting the resultant reaction product to hydrolysis and recovering said aminomethane-diphosphonic acid and its salts.

10 Claims, No Drawings

3,870,750

PROCESS FOR THE PRODUCTION OF AMINOMETHANE-DIPHOSPHONIC ACID AND ITS SALTS

REFERENCE TO A PRIOR APPLICATION

This application is a continuation of Ser. No. 90,455, filed Nov. 17, 1970, and now abandoned.

THE PRIOR ART

The preparation of 1-aminoalkane-1,1-diphosphonic acids by reaction of alkylnitriles with $PBr_3$ or $PCl_3$ is known, but satisfactory yields are only obtained with $PBr_3$. The preparation of compounds in which the amino group is substituted, for example by alkyl residues, is, however, not possible by this process. The preparation of N,N-dimethyl-1-aminomethane-1,1-diphosphonic acid tetraethyl ester by reaction of dimethyl formamide diacetal with diethyl phosphite is also known. This process is complicated, all the more so as the esters still have to be coverted into the free acids.

OBJECTS OF THE INVENTION

An object of the present invention is the development of a process for the production of aminomethane-diphosphonic acids and its salts.

Another object is the development of a process for the production of aminomethane-diphosphonic acid and its salts which consists essentially of the steps of reacting a phosphorus trihalide selected from the group consisting of phosphorus trichloride and phosphorus tribromide with formamide at a temperature of from 0° to 75°C., subjecting the resultant reaction product to hydrolysis and recovering said aminomethane-diphosphonic acid and its salts.

These and other objects of the invention will become more apparent as the description thereof proceeds.

DESCRIPTION OF THE INVENTION

It has now been found that aminomethanediphosphonic acid or its salts may be easily prepared when the process described below is used.

The present invention provides a process for the preparation of aminomethanediphosphonic acid or its salts comprising reacting a phosphorus trihalide with formamide and hydrolysing the reaction product, and, if desired, converting the acid so obtained into a salt.

The reaction of phosphorus trihalide, particularily phosphorus trichloride and phosphorus tribromide, especially phosphorus trichloride, and formamide may be carried out in the presence or absence of organic solvents such as, especially, chlorinated hydrocarbons or ethers. The reaction suitably takes place at temperatures from 0° to 75°C., preferably 45 to 65°C.

The molar ratio of phosphorus trihalide to formamide may vary within relatively wide limits from about 4 : 1 to 1 : 4. The reaction is suitably effected in a range from 1 : 1 to 4 : 1.

For carrying out the reaction, it is simply necessary to mix the starting components, possibly with use of an organic solvent. It is generally expedient to leave or maintain the temperature of the reaction mixture for some time such as 10 minutes to 8 hours, within the given temperature range before effecting the subsequent hydrolysis.

The hydrolysis may be carried out by addition of an alkali such as alkali metal hydroxides and carbonates, for example KOH, NaOH, sodium carbonate and potassium carbonate in aqueous solution to the reaction mixture. The corresponding salts of aminomethanediphosphonic acid are then immediately obtained. Acid hydrolysis is also possible, however, in which the acid-reacting reaction mixture is treated with a corresponding amount of water. If desired, acids such as hydrochloric acid or acetic acid may be added. Such a method of operation is used especially when the molar ratio of phosphorus trihalide : formamide in the reaction mixture amounts to 2 : 1 to 4 : 1, in order to improve the yield.

The aminomethanediphosphonic acid or its salts, after addition of the hydrolysing agent, may be obtained from the reaction mixture by concentrating the solution and cooling or by precipitating with suitable organic solvents which are miscible with water. In particular, acetone, lower aliphatic alcohols or mixtures of acetone and ethyl acetate may be used as the organic solvent. It is often possible, however, to use the hydrolyzate obtained directly as a commercial product. In such cases it is advantageous to carry out the hydrolysis with water while simultaneously passing through steam, volatile constituents such as HCl or HBr then being driven off by steam distillation.

In a preferred embodiment, the process of the invention comprises carrying out the reaction of a phosphorus trihalide with formamide with simultaneous addition of phosphorous acid. A molar ratio of phosphorus trihalide to phosphorous acid of 1 : 1 has been found suitable. The yield of aminomethanediphosphonic acid may be increased with the method described immediately above.

Instead of phosphorous acid and $PCl_3$, $PCl_3$ and water may also be used, if the quantities are calculated so that theoretically a mixture of $PCl_3$ and $H_3PO_3$, preferably in the molar ratio of 1 : 1 is present. If desired, formamide may also be treated with the corresponding amount of water and then the phosphorus trihalide added.

Provided the corresponding salts are not already directly obtained, as in the case of an alkaline hydrolysis, the aminomethanediphosphonic acid formed may be converted into the respective salts desired by addition of an equivalent amount of a corresponding base.

In particular, a stepwise or complete neutralization of the phosphonic acid groups may be effected. The water-soluble salts, such as alkali metal or ammonium salts, are of special interest. These may be prepared by reacting the phosphonic acids with KOH, NaOH, $K_2CO_3$, $Na_2CO_3$ or ammonia. The corresponding mono-, di-, tri- or tetra-alkali metal diphosphonates are thereby obtained, depending on the respective amounts used. Further, aminomethanediphosphonic acids forms salts with organic bases. Suitable organic bases are mono-, di- or tri- alkanolamines, especially those having a carbon chain length of 1 to 4 carbon atoms, and also pyridine and guanidine and the reaction is carried out by methods known per se.

It is possible by the described method to prepare aminomethanediphosphonic acid or its salts in a simple way. The said compounds possess good complex-forming properties and may therefore be used in many technical fields, especially for water-softening and as builders for washing compositions.

Also it may be advantageous to form mixtures of other complex-forming substances, such as aminotriacetic acid, polyaminopolycarboxylic acids and/or condensed phosphates with the said substances.

The following examples illustrate the process of the invention without being limitative in any respect.

EXAMPLE 1.

137 g of PCl₃ were slowly added to 45 g of formamide and the reaction mixture was heated at about 60°C. for 1 hour. A solid mass is thereby formed. This mass was dissolved in a 2N caustic soda solution and hydrolyzed. The solution was passed through an acid ion exchanger, concentrated and aminomethanediphosphonic acid was precipitated with acetone. The yield was 28 percent, referred to formamide. Practically the same result is obtained when an equivalent amount of PBr₃ is used instead of PCl₃.

EXAMPLE 2

41.2 g of PCl₃ were slowly added to 45 g of formamide the reaction mixture was headed at 60°C. for an hour. A solid mass was thereby formed, which mass was dissolved in a 2N caustic soda solution and hydrolyzed. The solution was passed through an acid ion exchanger, concentrated and aminomethanediphosphonic acid was precipitated with acetone. The yield amounted to 30 percent, referred to PCl₃.

EXAMPLE 3.

41 g of PCl₃ were slowly added to a mixture of 45 g of formamide and 28 g of H₃PO₃ and the reaction mixture was heated at about 60°C. for 1 hour. A solid mass was thereby formed, which mass was dissolved in a 2N caustic soda solution and hydrolyzed. The solution was passed through an acid ion exchanger, concentrated and aminomethanediphosphonic acid was precipitated with acetone. The yield amounted to 68 percent, referred to PCl₃.

EXAMPLE 4

45 g of formamide were slowly added to 411 g of PCl₃ and the reaction mixture was heated at 60°C. for 1 hour. The solid mass thereby formed was dissolved in water and hydrolyzed. The solution was passed through an acid ion exchanger, concentrated and aminomethanediphosphonic acid was precipitated with acetone. The yield amounted to 5 percent referred to formamide.

EXAMPLE 5.

45 g of formamide were slowly added to a mixture of 411 g of PCl₃ and 82 g of H₃PO₃ and the reaction mixture was heated at 60°C. for 1 hour. The solid mass thereby obtained was dissolved in water and hydrolyzed. The solution was passed through an acid ion exchanger, concentrated and aminomethanediphosphonic acid was precipitated with acetone. The yield amounted to 27 percent referred to formamide.

The preceeding specific embodiments are illustrative of the practice of the invention. It is to be understood however, that other expedients known to those skilled in the art or disclosed herein may be employed with out departing from the spirit of the invention or the scope of the appended claims.

We claim:

1. A process for the production of an aminomethane-diphosphonate of the formula

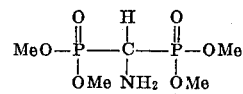

wherein Me represents a member selected from the group consisting of hydrogen and alkali metal which comprises the steps of reacting a phosphorus trihalide selected from the group consisting of phosphorus trichloride and phosphours tribromide with formamide at a temperature of from 0° to 75°C, wherein the molar ratio of said phosphorus trihalide to formamide is from about 4:1 to 1:4, subjecting the resultant reaction product to hydrolysis and recovering said aminomethanediphosphonate.

2. The process of claim 1 wherein said phosphorus trihalide is phosphorus trichloride.

3. The process of claim 1 wherein the molar ratio of said phosphorus trihalide to formamide is from 1:1 to 4:1.

4. The process of claim 1 wherein said reaction between said phosphorus trihalide and said formamide is conducted in the presence of phosphorous acid.

5. The process of claim 4 wherein the molar ratio of phosphorus trihalide to phosphorous acid is 1:1.

6. The process of claim 1 wherein said hydrolysis is effected by an aqueous solution of an alkali selected from the group consisting of alkali metal hydroxides and alkali metal carbonates and said aminomethanediphosphonate is recovered where Me is an alkali metal.

7. The process of claim 1 wherein said hydrolysis is effected by an aqueous solution of an alkali selected from the group consisting of alkali metal hydroxides and alkali metal carbonates, the aqueous alkali metal aminomethane-diphosphonate solution recovered is acidified by an acid ion exchanger and said aminomethane-diphosphonate is recovered where Me is hydrogen.

8. The process of claim 1 wherein said hydrolysis is effected by water and said aminomethanediphosphonate is recovered where Me is hydrogen.

9. The process of claim 8 wherein said hydrolysis with water is conducted while subjecting the reaction mixture to a steam distillation.

10. The process of claim 8 wherein the molar ratio of said phosphorus trihalide is from 2:1 to 4:1.

* * * * *

UNITED STATES PATENT OFFICE
CERTIFICATE OF CORRECTION

Patent No. 3,870,750　　　　　　　　Dated March 11, 1975

Inventor(s) Klaus Wollmann and Walter Ploger

It is certified that error appears in the above-identified patent and that said Letters Patent are hereby corrected as shown below:

In the Heading, Item (75), the third-named inventor should be --Karl-Heinz Worms-- .

Column 4, line 19, "phosphours" should be --phosphorus--

Signed and Sealed this second Day of March 1976

[SEAL]

Attest:

RUTH C. MASON
Attesting Officer

C. MARSHALL DANN
Commissioner of Patents and Trademarks